United States Patent
Kurihara et al.

(10) Patent No.: US 8,944,407 B2
(45) Date of Patent: Feb. 3, 2015

(54) EXHAUST GAS RECIRCULATION VALVE

(75) Inventors: Akihiro Kurihara, Tokyo (JP); Takuro Zui, Tokyo (JP); Satoru Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 384 days.

(21) Appl. No.: 13/320,658

(22) PCT Filed: Jul. 7, 2009

(86) PCT No.: PCT/JP2009/003150
§ 371 (c)(1),
(2), (4) Date: Nov. 15, 2011

(87) PCT Pub. No.: WO2011/004428
PCT Pub. Date: Jan. 13, 2011

(65) Prior Publication Data
US 2012/0061603 A1    Mar. 15, 2012

(51) Int. Cl.
*F16K 1/22* (2006.01)
*F02M 25/07* (2006.01)

(52) U.S. Cl.
CPC ............ *F16K 1/222* (2013.01); *F02M 25/0793* (2013.01); *Y02T 10/121* (2013.01)
USPC .......................................... 251/307; 251/337

(58) Field of Classification Search
USPC .......................................... 251/307, 308, 337
See application file for complete search history.

(56) References Cited

U.S. PATENT DOCUMENTS

| | | | |
|---|---|---|---|
| 4,037,819 A | | 7/1977 | Kindersley |
| 5,673,895 A | * | 10/1997 | Kaneko .......................... 251/306 |
| 6,079,695 A | * | 6/2000 | Gasaway et al. ............... 251/305 |
| 6,554,250 B2 | * | 4/2003 | Alves et al. .................... 251/305 |
| 7,406,823 B2 | * | 8/2008 | Takahashi ........................ 60/324 |
| 2006/0038151 A1 | * | 2/2006 | Nakamura ...................... 251/305 |
| 2006/0048505 A1 | | 3/2006 | Takahashi |

FOREIGN PATENT DOCUMENTS

| | | |
|---|---|---|
| JP | 53-131529 | 11/1978 |
| JP | 62-209273 A | 9/1987 |
| JP | 6-60740 U | 8/1994 |
| JP | 7-301344 A | 11/1995 |
| JP | 11-351417 A | 12/1999 |
| JP | 2001-173465 A | 6/2001 |
| JP | 2002-250467 A | 9/2002 |
| JP | 2004-225783 A | 8/2004 |
| JP | 2004-263723 A | 9/2004 |
| JP | 2005-299457 A | 10/2005 |

* cited by examiner

*Primary Examiner* — John K Fristoe, Jr.
*Assistant Examiner* — Daphne M Barry
(74) *Attorney, Agent, or Firm* — Birch, Stewart, Kolasch & Birch, LLP.

(57) ABSTRACT

A rotation axis O2 of a shaft 3 is attached thereto with double-offset in the X and Y directions with respect to a center line O1 of a valve seat 2. A bevel process is implemented on the outer peripheral surface of a valve 1 such that the valve 1 and the valve seat 2 is line-sealed, and the sign of the angles of inclination is switched between plus and minus at two places of the outer peripheral surface of the valve 1 deviated from the center of the axis. Further, a section where the angle of inclination is constant is prepared in each of the sections connecting the two places, while the other sections are smoothly connected to each other.

5 Claims, 5 Drawing Sheets

(a)

(b)

(a)

(c)

(b)

EXHAUST GAS RECIRCULATION VALVE

TECHNICAL FIELD

The present invention relates to the shapes of the valve and the valve seat of an exhaust gas recirculation valve (EGR-Valve).

BACKGROUND ART

In an exhaust gas recirculation valve, a valve body for adjusting the flow rate of a circulating exhaust gas is composed of a valve for opening and closing an exhaust gas passage and a rotation shaft for operating the valve. The rotation shaft is rotatably supported by a bearing section provided in a housing of the valve body. Incidentally, a valve seat is provided in the housing forming the exhaust gas passage, and the valve is rotated integrally with the rotation shaft and abut against the valve seat, thus choking the exhaust gas passage.

In a conventional exhaust gas recirculation valve, there is the following problem: when foreign matter such as deposit contained in an exhaust gas is deposited in the vicinity of the sealing faces between a valve and a valve seat, the valve and the valve seat stick to each other because of the bite of the foreign matter, thus hampering the opening and closing of the valve body.

In order to solve such a problem, Patent Document 1 discloses a butterfly valve used for an exhaust gas recirculation valve. In the butterfly valve, the outer peripheral surface of a circular valve is formed with a sloping face, a valve seat is composed of two components and has an annular difference in level provided therearound, and the outer peripheral surface of the valve is line-sealed with the annular difference in level of the valve seat over a wide range to choke an exhaust gas passage.

However, although the line seal is secured over the wide range in the above arrangement, in a closed state of the valve, the high pressure of the gas flowing in the exhaust gas passage acts on the rotation shaft of the valve to thereby apply a heavy load on a seal section in the vicinity of the shaft; when the seal is not formed, leakage from the corresponding section is increased. Further, the valve seat is composed of two components; thus, there is a drawback such that the arrangement thereof is complicated.

In order to cover such shortcomings, Patent Document 2 discloses a butterfly valve having a multiple-offset structure where the rotation axis of a valve is offset in the direction of thickness of the valve and the valve is completely circular in cross section.

PRIOR ART DOCUMENTS

Patent Documents

Patent Document 1: JP-A-2004-263723
Patent Document 2: JP-A-2004-225783

SUMMARY OF THE INVENTION

However, although the exhaust gas recirculation valve disclosed in Patent Document 2 discussed above can solve the problems of the butterfly valve disclosed in Patent Document 1 by adapting the multiple-offset structure, since the outer peripheral surface of the valve slides to partially gall the seal faces with the valve seal when the valve body is opened and closed, it is required that the seat face have elasticity and that a elastic seal of another member be selected, which pose a problem such that the valve is prone to become expensive.

The present invention has been made to solve the above-discussed problems, and an object of the present invention is to manufacture an exhaust gas recirculation valve at low cost by forming a line seal with the edge of a valve seat to increase the resistance to the bite and also simplifying the shape of the valve seat.

The exhaust gas recirculation valve according to the present invention is arranged as follows: the valve is formed to be smoothly inclined such that the sign of the angles of inclination of right and left outer peripheral surfaces on one set of orthogonal lines passing through the center of the valve switches between plus and minus at two places deviated from the center of the shaft, and the cross-sectional side shape of the valve taken along another set of orthogonal lines is formed in a trapezoidal shape, and the shaft is attached to a single offset position where the central axis of rotation of the shaft is offset from the center of the valve toward the side of the long base of the trapezoidal shape.

According to the present invention, the valve is formed such that the cross-sectional side shape of the valve taken along another set of orthogonal lines passing through the center of the valve is formed in a trapezoidal shape, and the shaft is attached to a single offset position where the central axis of rotation of the shaft is offset from the center of the valve toward the side of the long base of the trapezoidal shape; thus, the valve is line-sealed at the edge of the valve seat to increase the resistance to the bite and also can be manufactured at low cost by simplifying the shape of the valve seat.

BRIEF DESCRIPTION OF THE DRAWINGS

FIG. 1(a) is a plan view thereof; and FIG. 1(b) is a sectional view thereof taken along the line D-D in FIG. 1(a).

FIG. 2(a) is a plan view thereof; and FIG. 2(b) to FIG. 2(d) are sectional views thereof taken along the lines A'-A', B'-B', and C'-C', respectively.

FIG. 3(a) shows a opened state of the valve; and FIG. 3(b) shows a closed state of the valve.

FIG. 4(a) is a plan view thereof; FIG. 4(b) is a sectional view thereof taken along the line E-E in FIG. 4(a); and FIG. 4(c) is a sectional view thereof taken along the center line O1 in FIG. 4(a).

BEST MODE FOR CARRYING OUT THE INVENTION

Embodiments of the present invention will now be described with reference to the accompanying drawings in order to explain the present invention in more detail.

First Embodiment

Figure 1:
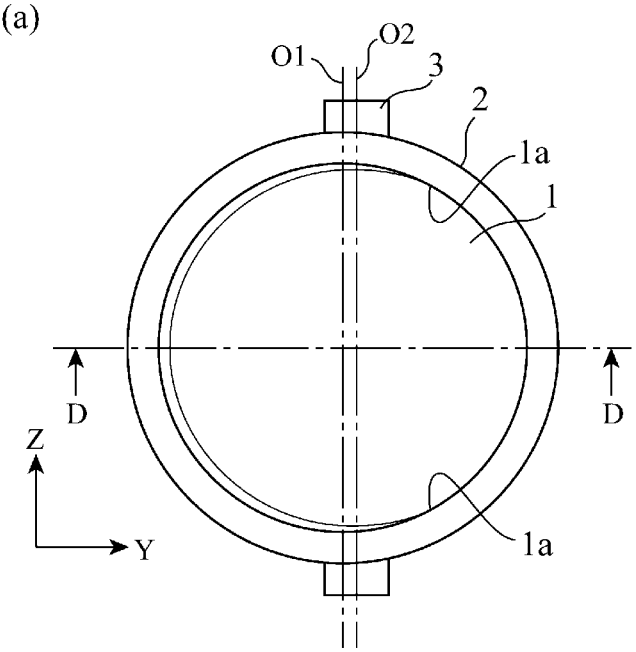
FIG. 1 shows an arrangement of an exhaust gas recirculation valve according to a first embodiment of the present invention.
Figure 1:
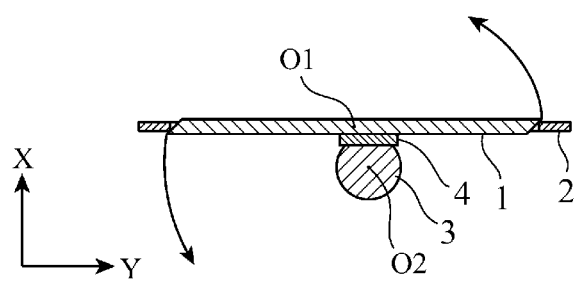

FIG. 1(a) is a plan view of an exhaust gas recirculation valve according to a first embodiment of the present invention, and FIG. 1(b) is a sectional view thereof taken along the line D-D in FIG. 1(a). FIG. 2(a) is a plan view showing the shape of a valve 1, and FIG. 2(b), FIG. 2(c), and FIG. 2(d) show sectional views thereof taken along the lines A'-A', B'-B', and C'-C', respectively. FIG. 3(a) is a sectional perspective view showing a opened state of the valve, taken along the line D-D in FIG. 1(a), and FIG. 3(b) is a sectional perspective view showing a closed state of the valve.

An exhaust gas recirculation valve includes a substantially circular valve 1, a valve seat 2 in which a completely circular opening is formed, a shaft 3 for rotating the valve 1, and a plate 4 interposed between the valve 1 and the shaft 3. A straight line passing through the center of the completely circular valve seat 2 is defined as a center line O1, and a central axis of rotation when the shaft 3 rotates the valve 1 is defined as a rotation axis O2.

The exhaust gas recirculation valve shown in the first embodiment is a double offset valve; the rotation axis (central axis of rotation) O2 of the shaft 3 is offset from the center line O1 of the valve seat 2 in the X direction (to a longer base side of a trapezoidal shape in cross-sectional side shape) to be single-offset, and is further offset in the Y direction (radially of the valve 1) to be double-offset. When the single offset is given such that the attaching face of the shaft 3 to the valve 1 is disposed on the downstream side of gas, the condition where the shaft 3 is exposed directly to the exhaust gas can be reduced in a closed state of the valve. In this manner, since no high pressure of the exhaust gas acts on the shaft 3, no heavy load is imposed on the vicinity of the attaching portion of the valve 1 and the shaft 3.

Further, when the shaft 3 is not fastened directly to the valve 1, but fixed thereto through the plate 4 interposed therebetween, the sticking areas between the valve 1 and the plate 4, and between the plate 4 and the shaft 3 are adjusted, thus increasing a fixed strength between the valve 1 and the shaft 3. Moreover, when the thickness of the plate 4 is changed, the eccentricity of the single offset can be adjusted.

Figure 2:
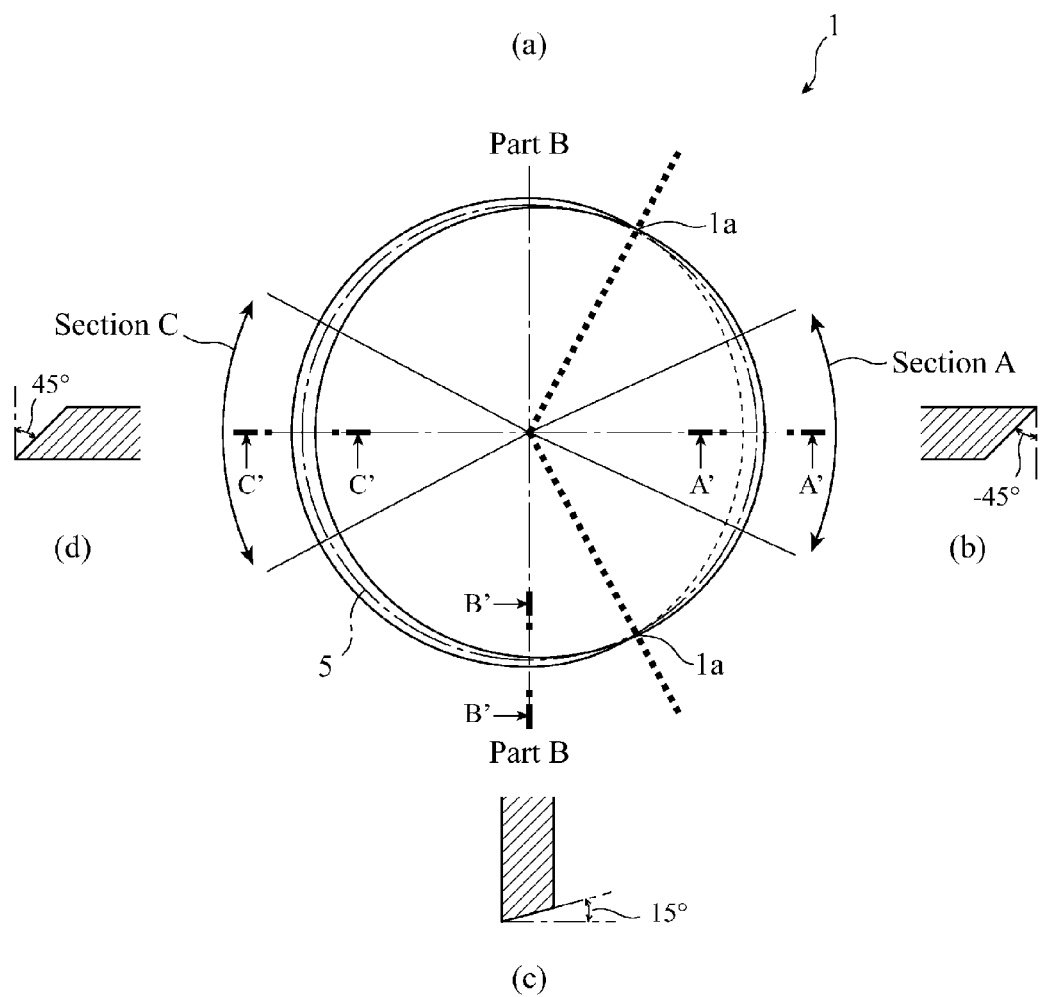
FIG. 2 shows a shape of a valve according to the first embodiment.
Figure 3:
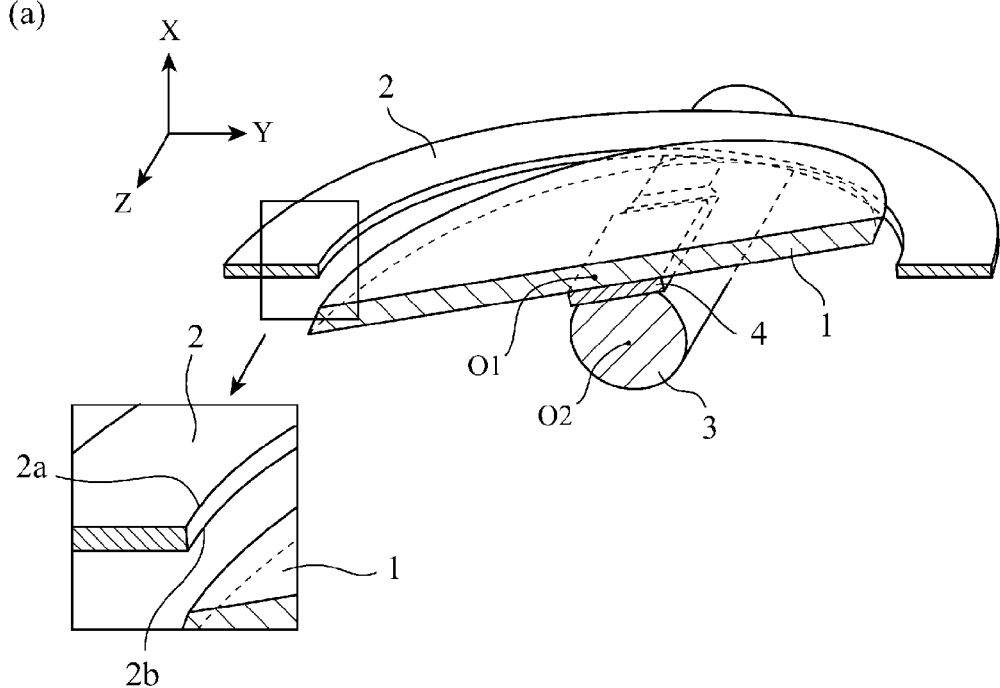
FIG. 3 is a sectional perspective view of the exhaust gas recirculation valve according to the first embodiment taken along the line D-D in FIG. 1(a)
Figure 3:
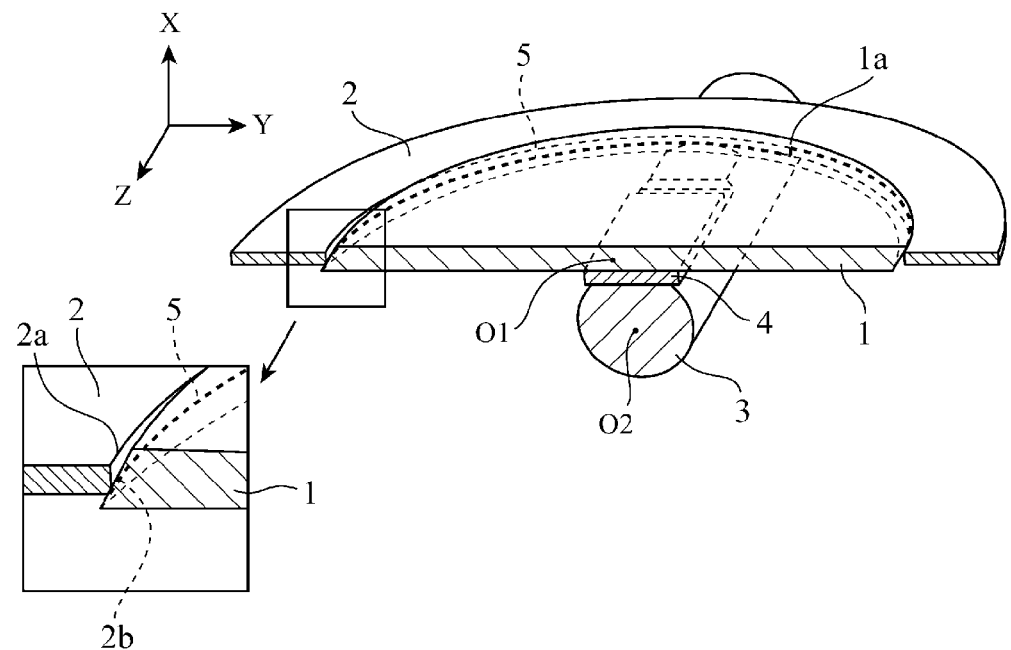

In order to conform to the double offset structure, a bevel process is given on the outer peripheral surface of the valve 1 as shown in FIG. 2 such that the valve 1 and the valve seat 2 can be brought into line contact with each other. The outer peripheral surface of the valve 1 is inclined –45 degrees at the section A that moves toward the viewer when the valve is opened (FIG. 2(b)), inclined +15 degrees at the vertical parts B located near the rotation axis O2 of the shaft 3 (FIG. 2(c)), and inclined +45 degrees at the section C that moves away from the viewer when the valve is opened (FIG. 2(d)). The other sections are subjected to a bevel process smoothly connected to each other such that the angles of inclination at the section A, parts B, and section C are retained. At that time, it is arranged that when a position deviated from the rotation axis O2 of the shaft 3 is defined as a seal section switching point 1a, the angle of inclination at the point is ±0 degrees, and the sign of the angles of inclination at the sections adjacent to the seal section switching point 1a are switched between plus and minus.

When the bevel process is thus implemented, the valve 1 abuts against the inner peripheral edge 2a on the near side of the valve seat 2 (FIG. 3) on the near side of the outer peripheral surface thereof in the section A; at the seal section switching point 1a, the position where the valve abuts against the valve seat is switched from the inner peripheral edge 2a on the near side of the valve seat 2 to the inner peripheral edge 2b on the back side thereof (FIG. 3); and in the parts B and section C, the valve abuts against the inner peripheral edge 2b on the back side of the valve seat 2 in a portion near to the back side of the outer peripheral surface thereof. Therefore, when the valve is closed, a seal section 5 in which the valve 1 abuts against the valve seat 2 can be formed in a line seal online contact. With the line seal formed therebetween, the contact area between the valve 1 and the valve seat 2 is small; thus, in the case where the vale is disposed in an exhaust gas passage, the possibility that bites foreign matter such as deposit contained in an exhaust gas is reduced, and the sticking in the seal section 5 is lowered, thus reducing the torque interfering with the opening and closing operation.

Further, since the seal section switching point 1a is configured in a position deviated from the rotation axis O2 of the shaft 3, the valve 1 does not interfere with the completely circular opening of the valve seat 2 in the vicinity of the rotation axis O2 of the shaft 3, which enables to form a round (round-the-circumference) line seal. Therefore, gas-tightness thereof can be enhanced to achieve a theoretical leak clearance of zero.

Incidentally, the bevel process shown in FIG. 2 is merely one example, and according to the conditions such as the eccentricity of the rotation axis O2 of the shaft 3, the thickness of the valve 1 and the like, the angle of inclination, the beveled sections, the position of the seal section switching point, and the like may be appropriately designed. Furthermore, since the inner periphery of the opening of the valve seat 2 is formed in a completely circular shape, a lathe process can be adapted to the formation of the completely circular opening of the valve seat 2, thereby reducing the machining cost thereof.

As discussed above, according to the first embodiment, it is configured as follows: the rotation axis O2 of the shaft 3 is attached to the double offset position where the single offset position, which is offset from the center line O1 of the valve seat 2 toward the side of the long base of the trapezoidal shape, is further offset in the radial direction of the valve; the outer peripheral surface of the valve 1 is inclined smoothly such that the sign of the angles of inclination switches between plus and minus at the two seal section switching points 1a, which are deviated from the center of the shaft; and the sections A and C where the angle of inclination is constant are provided in the sections connecting the seal section switching points 1a. For this reason, the valve 1 can be line-sealed at the edge of the completely circular opening of the valve seat 2, thereby increasing the resistance to the bite of foreign matter, and also the round line seal is enabled to enhance the gas-tightness, which can achieve a theoretical leak clearance of zero. Also, it is possible to form the opening of the valve seat 2 in a simplified completely circular shape, which enables to manufacture the seat at low cost. Further, the shaft 3 is arranged to be attached to the valve 1 through the plate 4 interposed therebetween; thus, the fixed strength between the shaft 3 and the valve 1 can be improved, and also the eccentricity of the single offset can be adjusted.

Second Embodiment

Figure 4:
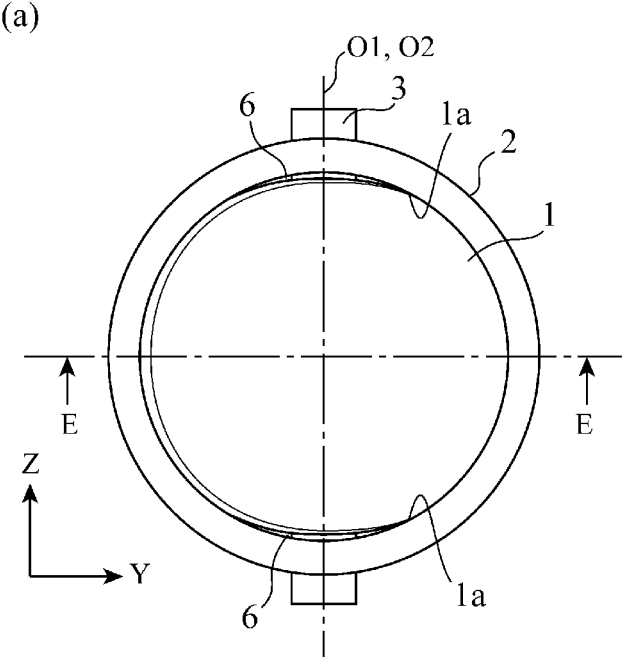
FIG. 4 shows an arrangement of an exhaust gas recirculation valve according to a second embodiment of the present invention.
Figure 4:
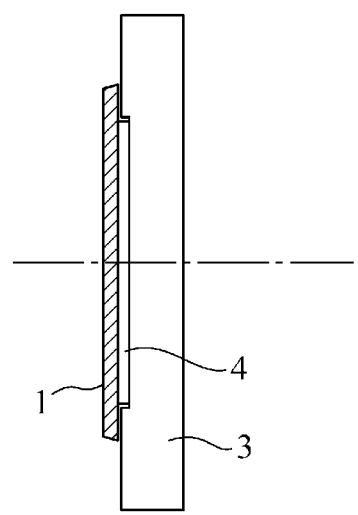
Figure 4:
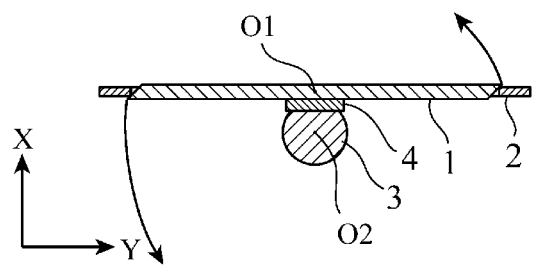

FIG. 4 shows an arrangement of an exhaust gas recirculation valve according to a second embodiment: FIG. 4(a) is a plan view thereof, FIG. 4(b) is a sectional view thereof taken along the line E-E in FIG. 4(a), and FIG. 4(c) is a sectional view thereof taken along the center line O1 in FIG. 4(a). The exhaust gas recirculation valve shown in the first embodiment is arranged to have a double offset structure; however, the exhaust gas recirculation valve according to the second embodiment is arranged to have a single offset structure. Specifically, the rotation axis O2 of a shaft 3 is single-offset from the center of a valve toward the side of the long base of a trapezoidal shape thereof. The valve 1 is symmetric with respect to the rotation axis O2 of the shaft 3 in the closed state of the valve, and thus there is no difference between the pressures applied on the right and left of the valve 1 by an exhaust gas in the closed state of the valve. Therefore, a valve opening force because of the pressure difference can be canceled.

Also in the valve 1 of the second embodiment, a bevel process is implemented on the outer peripheral surface thereof as shown in FIG. 2 of the above first embodiment. However, since the valve 1 interferes with the valve seat 2 in the vicinity of the rotation axis O2 of the shaft 3 upon rotation of the shaft 3, it is necessary to prepare a minute clearance 6 in the interfering portions. When the clearances 6 are prepared, it is impossible to form a round line seal with respect to the valve 1 and the valve seat 2; thus, there is a possibility that a leak thereof is generated very slightly through the clearances 6. Hereupon, in FIG. 4, it is arranged that the two poles of the valve 1 are transformed to form the clearances 6, while the opening of the valve seat 2 is not transformed to maintain the completely circular shape thereof. Thus, the process of the valve seat 2 is simple.

As discussed above, according to the second embodiment, the shaft 3 is arranged to be attached in the single offset position where the rotation axis O2 thereof is offset from the center line O1 of the valve seat 2 toward the side of the long base of the trapezoidal shape. For this reason, the surface area of the valve 1 is laterally symmetric with respect to the rotation axis O2 of the shaft 3 when the valve is closed; thus, even if a lateral pressure difference is caused when the valve is closed, an opening force thereof can be canceled.

In this context, also in the exhaust gas recirculation valve having the single offset structure shown in the second embodiment, as in the above first embodiment, when a single offset is implemented such that the attaching face of the shaft 3 to the valve 1 is disposed on the downstream side of the gas, no load due to a high pressure exhaust gas is applied to the vicinity of the attaching portion. Further, since the bevel process is implemented on the outer peripheral surface of the valve 1, the valve 1 is brought into line contact with the valve seat 2 to create a line seal, thereby increasing the resistance to the bite of foreign matter. Moreover, the opening of the valve seat 2 can be formed in a simplified completely circular shape to thus manufacture the valve seat at low cost. Furthermore, when the plate 4 is employed, the fixed strength between the valve 1 and the shaft 3 can be increased, and also the eccentricity of the single offset can be adjusted.

Third Embodiment

Figure 5:
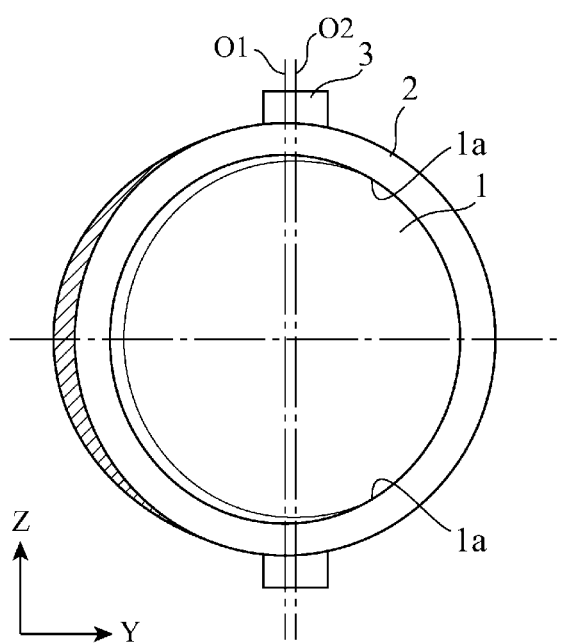
FIG. 5 is a plan view showing an arrangement of an exhaust gas recirculation valve according to a third embodiment of the present invention.

FIG. 5 is a plan view showing an arrangement of an exhaust gas recirculation valve of a third embodiment.

In the exhaust gas recirculation valve shown in the above first embodiment, to provide a double offset structure, the rotation axis O2 of the shaft 3 is offset from the center line O1 of the valve seat 2 in the Y direction. Therefore, there is a slight difference between the torques developed on the right and left surfaces of the valve 1 with respect to the rotation central axis O2 of the shaft 3; when there is a large difference between the pressures on the right and left surfaces of the valve 1 exerted by an exhaust gas in the closed state of the valve, an opening force may be produced. For this reason, in the third embodiment, as shown in FIG. 5, a balanced valve structure is configured, in addition to a double offset structure.

In FIG. 5, when the areas of the valve 1 and the valve seat 2 each are reduced by a hatched area, the torques developed on the right and left surfaces of the valve 1 with respect to the rotation axis O2 of the shaft 3 are equalized; thus, there is provided a structure where the pressure applied on the valve 1 is dispersed equally on the right and left. With this structure, a valve opening force because of the pressure difference caused on the right and left of the valve 1 can be canceled.

As discussed above, according to the third embodiment, it is configured that the rotation axis O2 of the shaft 3 is attached to the double offset position where the single offset position, which is offset from the center line O1 of the valve seat 2 toward the side of the long base of the trapezoidal shape, is further offset in the radial direction of the valve, and that the torques developed on the right and left surfaces of the valve 1 with respect to the rotation axis O2 of the shaft 3 are equalized. Therefore, even if there is caused a pressure difference between the right and left when the valve is closed, the valve opening force can be canceled.

In this context, also in the exhaust gas recirculation valve having the double offset structure shown in the third embodiment, as in the above first embodiment, when a single offset is implemented such that the attaching face of the shaft 3 to the valve 1 is disposed on the downstream side of the gas, no load due to a high pressure exhaust gas is applied to the vicinity of the attaching portion when the valve is closed. Furthermore, the valve 1 is line-sealed at the edge of the circular opening of the valve seat 2 to thus increase the resistance to the bite of foreign matter, and also a round line seal is enabled to enhance the gas-tightness, which can achieve a theoretical leak clearance of zero. Moreover, when the valve 1 is fixed to the shaft 3 through the plate interposed therebetween, the fixed strength is increased and also the eccentricity of the single offset can be adjusted.

INDUSTRIAL APPLICABILITY

As discussed above, the exhaust gas recirculation valve of the present invention is arranged such that the bevel process is implemented on the outer peripheral surface of the valve having the offset structure to be line-sealed with the valve seat, and is suitable for use in, for example, an exhaust gas recirculation valve such that deposition of deposit is generated.

The invention claimed is:

1. An exhaust gas recirculation valve including:
   a circular valve;
   a valve seat in which a circular opening that abuts against the outer peripheral surface of the valve is formed; and
   a shaft that rotates integrally with the valve to open and close the circular opening,
   wherein the valve is formed to be smoothly inclined such that the sign of the angles of inclination of outer peripheral surfaces switches between plus and minus at two places deviated, in plan view of the valve, from an axis of rotation of the shaft toward an opposite side to a center of the circular valve, and a cross-sectional side shape of the valve taken along the axis of rotation of the shaft is formed in a trapezoidal shape, and
   wherein the shaft is attached to a single offset position where the axis of rotation of the shaft is offset from the center of the valve toward the side of the long base of the trapezoidal shape.

2. The exhaust gas recirculation valve according to claim 1, wherein the shaft is attached to a double offset position such that the axis of rotation of the shaft is further offset from the single offset position to a position in the radial direction of the valve.

3. The exhaust gas recirculation valve according to claim 1, wherein the circular opening of the valve seat is a completely circular shape.

4. The exhaust gas recirculation valve according to claim 1, wherein a section where the angle of inclination is constant is provided on the outer peripheral surface of the valve in each of the sections of the outer peripheral surface connecting the two places where the sign of the angles of inclination switches between plus and minus.

5. The exhaust gas recirculation valve according to claim 1, wherein the shaft is attached to the valve through a plate interposed therebetween.

* * * * *